(12) United States Patent
Jain

(10) Patent No.: US 6,789,150 B1
(45) Date of Patent: Sep. 7, 2004

(54) INTEGRATED CIRCUIT HAVING ARBITRATED SWITCHING BETWEEN BUSSES

(75) Inventor: Raj Kumar Jain, Singapore (SG)

(73) Assignee: Infineon Technologies A.G., Munich (DE)

( * ) Notice: Subject to any disclaimer, the term of this patent is extended or adjusted under 35 U.S.C. 154(b) by 0 days.

(21) Appl. No.: 09/601,581
(22) PCT Filed: Feb. 16, 1998
(86) PCT No.: PCT/SG98/00012
§ 371 (c)(1), (2), (4) Date: Aug. 2, 2000
(87) PCT Pub. No.: WO99/41674
PCT Pub. Date: Aug. 19, 1999

(51) Int. Cl.$^7$ .............................................. G06F 13/14
(52) U.S. Cl. ...................... 710/305; 710/264; 710/244; 710/316
(58) Field of Search ................................ 710/305, 306, 710/59, 260–264, 240–244, 213, 316–317; 709/213; 712/209, 29, 223

(56) References Cited

U.S. PATENT DOCUMENTS

| 5,481,677 A | | 1/1996 | Kai et al. | 395/280 |
|---|---|---|---|---|
| 5,513,374 A | * | 4/1996 | Baji | 710/26 |
| 5,577,214 A | * | 11/1996 | Bhattacharya | 710/107 |
| 5,604,865 A | * | 2/1997 | Lentz et al. | 710/316 |
| 5,619,726 A | * | 4/1997 | Seconi et al. | 710/22 |
| 5,701,495 A | * | 12/1997 | Arndt et al. | 710/263 |
| 5,889,948 A | * | 3/1999 | Smolansky et al. | 709/213 |
| 5,901,295 A | * | 5/1999 | Yazdy | 710/113 |
| 5,915,103 A | * | 6/1999 | Chambers et al. | 710/313 |
| 5,931,937 A | * | 8/1999 | Klein | 710/269 |
| 5,933,612 A | * | 8/1999 | Kelly et al. | 710/311 |
| 6,035,360 A | * | 3/2000 | Doidge et al. | 710/107 |
| 6,055,584 A | * | 4/2000 | Bridges et al. | 710/27 |
| 6,272,579 B1 | * | 8/2001 | Lentz et al. | 710/116 |
| 6,493,776 B1 | * | 12/2002 | Courtright et al. | 710/110 |

FOREIGN PATENT DOCUMENTS

EP 0545581 A2 6/1993

* cited by examiner

Primary Examiner—Khanh Dang
Assistant Examiner—Kim T. Huynh
(74) Attorney, Agent, or Firm—Senniger Powers

(57) ABSTRACT

An integrated circuit (1) includes a processing device (2), a program interface (4, 5) coupled to the processing device (2), a data interface (6, 7) coupled to the processing device. The program interface (4, 5) includes a first address bus (4) and a first data bus (5) and the data interface (6, 7) includes a second address bus (6) and a second data bus (7). The integrated circuit also includes address and data bus switching devices (18) and a control device (16). The address bus switching device (18) is coupled to the first and second address buses (4, 6) and adapted to be coupled to an external address bus (11) and the data bus switching device (18) is adapted to be coupled to an external data bus (12) and is coupled to the first and second data buses (5, 7). The control device (16) is coupled to the processing device (2), the address bus switching device (18) and the data bus switching device (18). The control device (16) controls the address and data bus switching devices (18) to couple the first address bus (4) and the first data bus (5) to the external address and data buses (11, 12) or to couple the second address bus (6) and the second data bus (7) to the external address and data buses (11, 12), in response to control signals received from the processing device (2).

5 Claims, 7 Drawing Sheets

| W | P | D | 1. CYCLE | 2. CYCLE | 3. CYCLE | 4. CYCLE | VIEW |
|---|---|---|---|---|---|---|---|
| 0 | 0 | 0 | PROGRAM DUMMY | | | | C-BUS |
| | | | PROGRAM | | | | INTERNAL |
| | | | DATA | | | | INTERNAL |
| 0 | 0 | 1 | PROGRAM DUMMY | DATA (R/W) | | | C-BUS |
| | | | PROGRAM (R/W) | | | | INTERNAL |
| 0 | 1 | 0 | PROGRAM (R) | | | | C-BUS |
| | | | DATA | | | | INTERNAL |
| 0 | 1 | 1 | PROGRAM (R) | DATA (R/W) | DATA (R/W) | | C-BUS |
| 1 | 0 | 0 | ----- | | | | C-BUS |
| | | | PROGRAM | | | | INTERNAL |
| | | | DATA | | | | INTERNAL |
| 1 | 0 | 1 | DATA (R/W) | DATA (R/W) | | | C-BUS |
| | | | PROGRAM | | | | INTERNAL |
| 1 | 1 | 0 | PROGRAM (R/W) | PROGRAM (R/W) | | | C-BUS |
| | | | DATA | | | | INTERNAL |
| 1 | 1 | 1 | PROGRAM (R/W) | PROGRAM (R/W) | DATA (R/W) | DATA (R/W) | C-BUS |

FIG. 3

INTEGRATED CIRCUIT HAVING ARBITRATED SWITCHING BETWEEN BUSSES

The invention relates to an integrated circuit comprising processing device, such as a micro controller or micro processor.

Digital signal processors (DSP), such as those in modem chips, commonly include a program interface and a data interface. The program interface comprises an address bus and a data bus and the data interface also comprises another address bus and another data bus. Each of the four buses will normally have 16 parallel lines. Hence, if each of the four buses is required to connect to a memory, or other device, outside of the integrated circuit in which the DSP is located, a pin for each line on each bus is required. Typically, three pins are also required for control signals. Hence, the total number of pins required on the integrated circuit to communicate with the DSP is 70 pins. As a large element of the cost of producing integrated circuits is dependent on the number of pins required by the integrated circuit to communicate with external devices, the provision of 70 pins results in an expensive integrated circuit.

One method of reducing the number of external pins is to locate more memory devices on the integrated circuit itself to reduce the requirement of the DSP to communicate with external devices. However, memory tends to be expensive and to incorporate large memory capacities onto an integrated circuit is expensive. There is also the disadvantage that the memory cannot be upgraded without replacing the entire integrated circuit, including the DSP and other components which may not require to be upgraded.

Therefore, it is desirable to locate the memories outside of the integrated circuit on which the DSP is located to permit memories to be easily upgraded.

A solution to reduce the number of pins for communicating with the program interface and data interface of the DSP, while maintaining memory devices outside the integrated circuit, is to couple the data and program address buses to an internal switching device within the integrated circuit which can couple either of the address buses to an external address bus and similarly couple the data buses to another switching device which permits either one of the data buses to be coupled to an external data bus.

Although this solution reduces the number of pins on the integrated circuit, it has the disadvantage that it requires firm ware on the integrated circuit to control the switching devices. In addition, the switching devices can only be switched when the buses are not in use and furthermore, a number of clock cycles are required to perform the switching operation. Hence, for example, if the buses for the program interface are coupled to the external address and data buses, the switching devices can only switch the data interface buses to the external address and data buses after the program interface has finished using the external address and data buses. After the program interface has finished using the external address and data buses, a number of clock cycles are required before the data interface can commence use of the external address and data buses.

Therefore, although the cost of the packaging is reduced for the integrated circuit by reducing the number of pins, the speed at which the DSP can access the external memories is limited by the switching time, and that only the program interface or the data interface can be coupled to the external address and data buses at any one time.

In accordance with the present invention, an integrated circuit comprises a processing device; a program interface coupled to the processing device, the program interface comprising a first address bus and a first data bus; a data interface coupled to the processing device, the data interface comprising a second address bus and a second data bus; an address bus switching device adapted be coupled to an external address bus, the address bus switching device coupled to the first and second address buses; a data bus switching device adapted to be coupled to an external data bus, the data bus switching device coupled to the first and second data buses; and a control device coupled to the processing device, the address bus switching device and the data bus switching device, the control device controlling the address and data bus switching devices to couple the first address bus and the first data bus to the external address and data buses or to couple the second address bus and the second data bus to the external address and data buses, in response to control signals received from the processing device.

An advantage of the invention is that by providing an integrated circuit with a processing device and a control device coupled to the processing device and to the data and address bus interfaces, it is possible to switch the external data and address buses between the program interface and the data interface during the same clock cycle.

Preferably, the control device comprises arbitration means which prioritises requests for coupling to the external address and data buses from the program interface and the data interface. Typically, the arbitration means allocates priority to the program interface.

Preferably, the control device further comprises a delay generation means which generates a delay signal which the control device sends to the processing device to prolong a processing device cycle to correspond to an access speed of an external memory being accessed by the processing device through the data and address bus switching devices.

Preferably, the delay generation means generates delays which are a multiple of the processing device fundamental clock cycle period.

An example of an integrated circuit in accordance with the invention will now be described with reference to the accompanying drawings, in which:

FIG. 3 is a state table for the common bus interface unit shown in FIG. 2;

Figure 1:
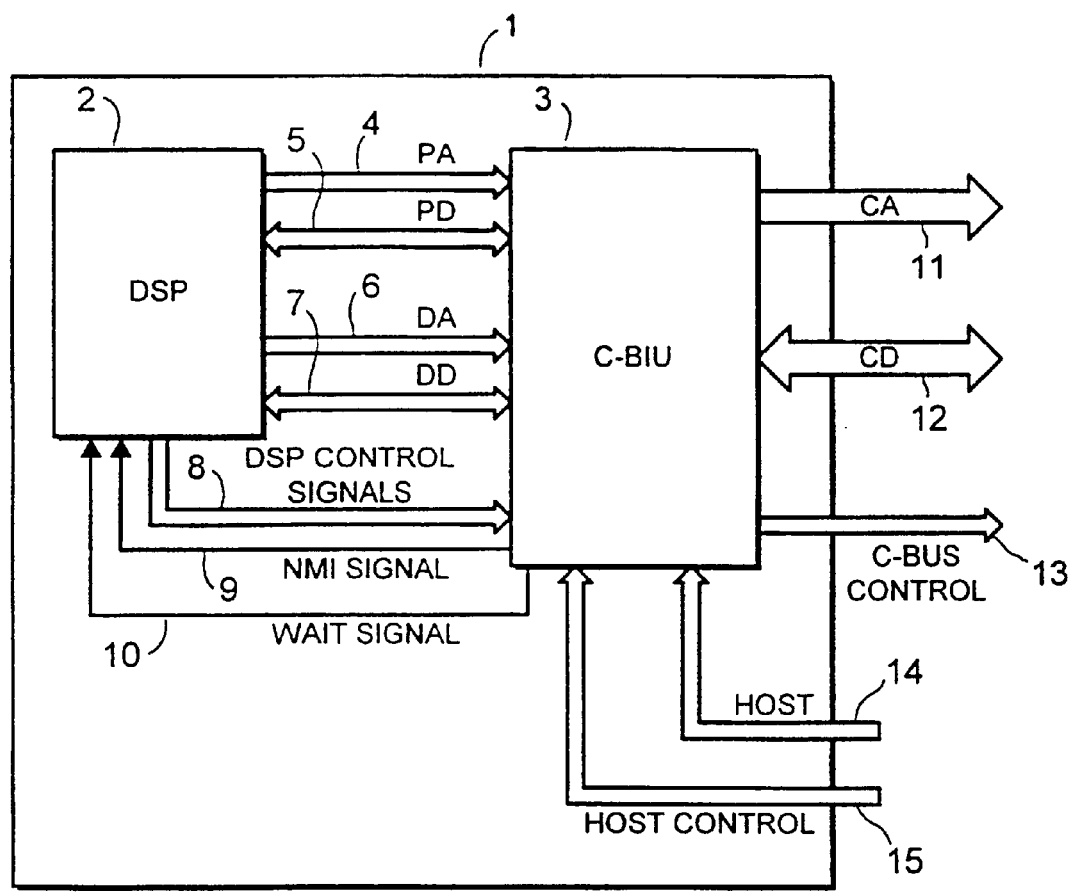
FIG. 1 is a schematic view of an integrated circuit having a digital signal processor and incorporating a common bus interface unit.

FIG. 1 shows an integrated circuit 1 which includes a digital signal processor (DSP) 2 and common bus interface unit (C-BIU) 3. The DSP 2 has a program interface which includes a program address bus (PA) 4 and a program data bus (PD) 5. The DSP 2 also has a data interface which comprises a data address bus (DA) 6 and a data data bus (DD) 7. The address and data buses 4, 5, 6, 7 are coupled to the C-BIU 3 as well as to internal memory devices (not shown) also located on the integrated circuit 1. A DSP control signal bus 8 supplies control signals from the DSP 2 to the C-BIU 3. The C-BIU 3 can send a non-maskable interrupt signal 9 to the DSP 2 and a wait signal 10 to the DSP 2.

The C-BIU 3 is also coupled to a common address bus (CA) 11 and a common data bus (CD) 12, and can supply control signals to the common address and data buses 11, 12 via a common bus control bus 13.

In addition, the C-BIU 3 can be coupled to a host processor (not shown) via a host bus 14 and a host control bus 15.

The common address and data buses 11, 12 enable the integrated circuit 1 and in particular, the DSP 2, to communicate with devices, such as memory devices located outside the integrated circuit 1.

Figure 2:
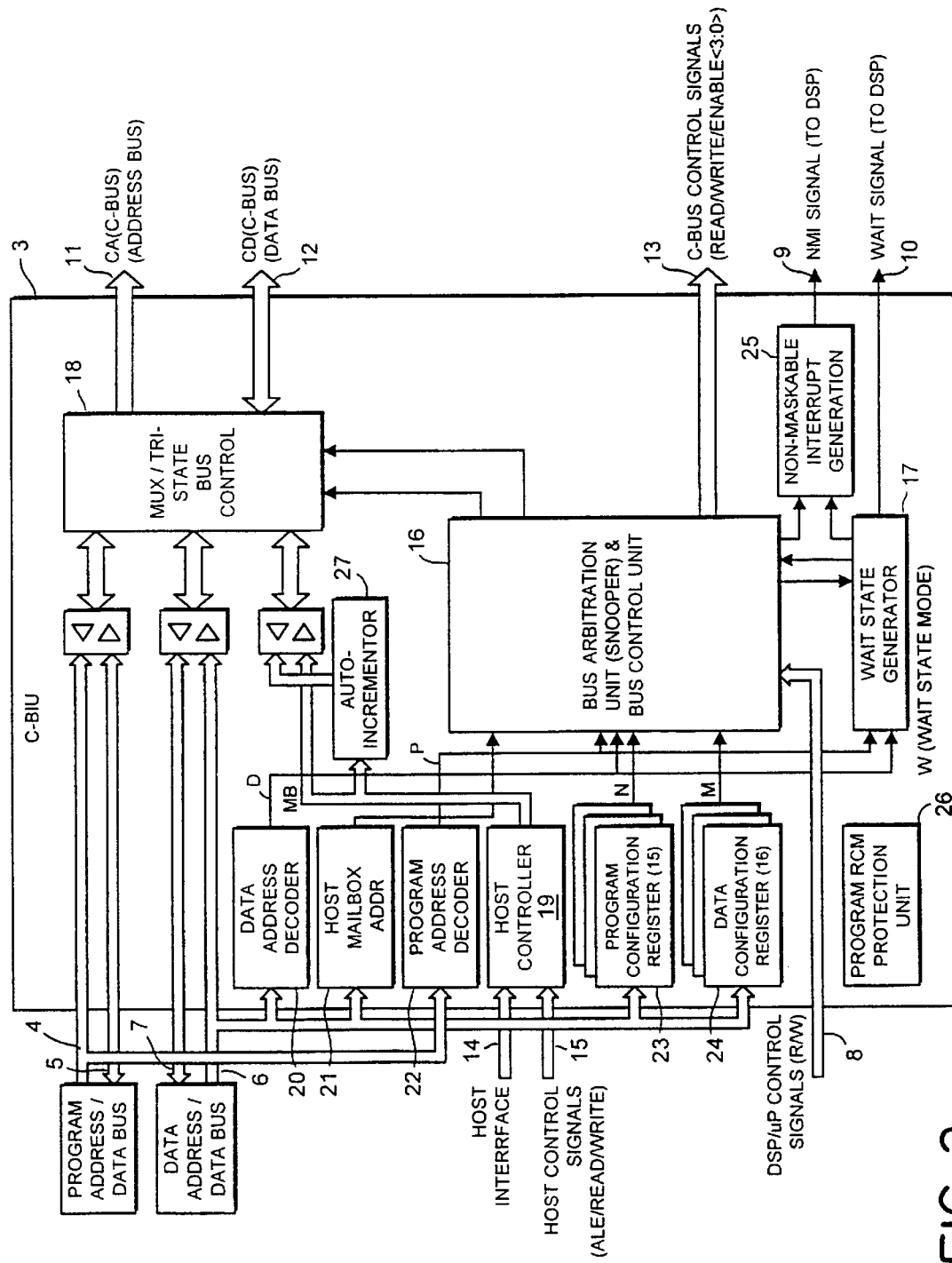
FIG. 2 is a schematic diagram showing a simplified architecture of the common bus interface unit.

A simplified architecture of the common bus interface unit 3 is shown in more detail in FIG. 2. The main units of the C-BIU 3 are a bus arbitration and control unit 16 and a wait state generator 17. The bus arbitration and control unit 16 controls a multiplexer/tri-state bus control 18 which switches the appropriate buses 4–7 to the common address and data buses 11, 12 in response to control signals received from the bus arbitration and bus control unit 16. In addition, the bus arbitration and control unit 16 can control the multiplexer/tri state bus control 18 to which the common address and data buses to host bus 14 via a host controller 19. The bus arbitration and control unit 16 receives control signals from the DSP on the control signal bus 8 and also receives inputs from a data address decoder 20, a host mail box address 21, a program address decoder 22, program configuration registers 23 and data configuration registers 24. The data address decoder 20, the host mail box 21, the program configuration registers 23 and the data configuration registers 24 all receive inputs from the data address bus 6. The program address decoder 22 receives an input from the program address bus 4.

As well as controlling the multiplexer/tri state bus control 18, the bus arbitration and control unit 16 also controls the common buses 11, 12 using a control signal bus 13 and communicates with the wait state generator 17 as well as instructing a non maskable interrupt generation unit 25.

The host which communicates with the C-BIU 3 via host bus 14 and the host control bus 15 may be processor, micro controller or any other external device which interfaces with the integrated circuit 1.

The program configuration registers 23 and the data configuration registers 24 are programmable by the DSP 2 via the data address bus 6 and provide integer values N, M respectively to the bus arbitration and control unit 16. The integer values of N and M are dependent on the external memory being accessed. For example, for high performance memories the values of N and M will typically be low numbers. However, for low cost, low performance memories, the N and M values will typically be high. The bus arbitration and control unit 16 controls the wait state generator 17 to generate a wait state in response to the N and M values. Where the N and M values are low integers, the wait state generated by the wait state generator 17 will also be low and where the N and M values are high integers, the wait state generated by the wait state generator 17 will also be high. The wait state generated by the wait state generator extends the fundamental clock cycle of the DSP 2 by an additional time period of one fundamental clock cycle for each wait state generated. This is described in more detail below.

The C-BIU 3 also includes a program ROM protection unit 26. The program ROM protection unit 26 disables program access to external memory to protect the program available to the user.

In addition, the C-BIU 3 also includes an auto-incrementor 27. The auto-incrementor 27 is activated by host access on the host bus 14 and host control bus 15 via the host controller 19 and automatically increments the address on the common address bus 11 for program download by the host. This feature reduces the number of cycles required to download the program to external memory interface so that the host needs to send only the data over the demultiplexed host interface to be downloaded to the external memory without requiring to supply an address, as this is automatically generated by the auto-incrementor 27.

The data address decoder 20 and the program address decoder 22 decode the address range from the requested access by the DSP 2, check from the configuration registers whether the address has been enabled and also determine the necessary program read, program write, data read and data write operations.

The non-maskable interrupt generation unit 25 could be generated to the DSP for every access to external memory.

In the event that the DSP 2 requests a program access operation, a signal P from the program address decoder 22 to the bus arbitration and control unit 16 and the wait state generator 17 will go high to indicate the DSP 2 is requesting a program access operation. If the DSP 2 requests a data access operation, the data address decoder 20 will detect this and a high signal D will be input to the bus arbitration and control unit 16 and the wait state generator 17 to indicate that the DSP 2 is requesting a data access operation.

The number of wait states generated by the wait state generator 17 will depend on the values of N and M and also the requirements determined by the bus arbitration and control unit 16 from the P and D signals from the program address decoder 22 and the data address decoder 20, respectively.

Typically, the integers N and M may be any integers from 0 to 15.

FIG. 3 shows an example of a state table for the C-BIU 3 where the values P and D refer to signals P and D from the data address decoder 20 and the program address decoder 22, and W refers to the number of wait states programmed in the wait state generator 17. The terms "one cycle", "two cycle", "three cycle" and "four cycle" refer to the number of DSP fundamental clock cycle periods over which the relevant operation occurs. One cycle is equal to a wait signal 10 of 0 (i.e. 0 wait state), two cycles are equal to a wait signal 10 of 1 (i.e. 1 wait state), three cycles are equal to a wait signal 10 of 2 (i.e. 2 wait states). Hence, the extended cycle, which is the number of fundamental clock cycle periods over which an operation takes place is equal to the value of the wait signal 10 (i.e. the number of wait states) plus 1.

In the case where W=0, P=0 and D=0 there is no program or data operation requiring external access, therefore no wait state is generated and the DSP clock cycle is not extended. If W=0, P=0 and D=1, the bus arbitration and control unit 16 recognises from the D=1 signal that the DSP 2 requires an external data read or write operation on the common buses 11, 12. Accordingly, to allow for external memory access times, the bus arbitration and control unit 16 instructs the wait state generator 17 to send a wait signal 10 to the DSP 2 to prolong the current clock cycle to twice the fundamental clock cycle period, i.e. 1 wait state is generated by the wait state generator 17. If P=1 and D=0, the bus arbitration and control unit 16 recognises that the DSP 2 requires a program read or write operation using the common buses 11, 12 and does not instruct the wait state generator 17 to generate a wait signal 10 to the DSP 2.

If P=1 and D=1, the bus arbitration and control unit 16 recognises that the DSP 2 requires to make a program read or write operation and a data read or write operation. The bus arbitration and control unit 16 determines that it will not be possible to do this operation using the common buses 11, 12 and one fundamental clock cycle period. Therefore, the bus arbitration and control unit 16 instructs the wait state generator 17 to send a wait signal 10 with a value=2 (i.e. 2 wait states) to extend the current clock cycle to three times the length of the fundamental clock cycle period.

Figure 4:
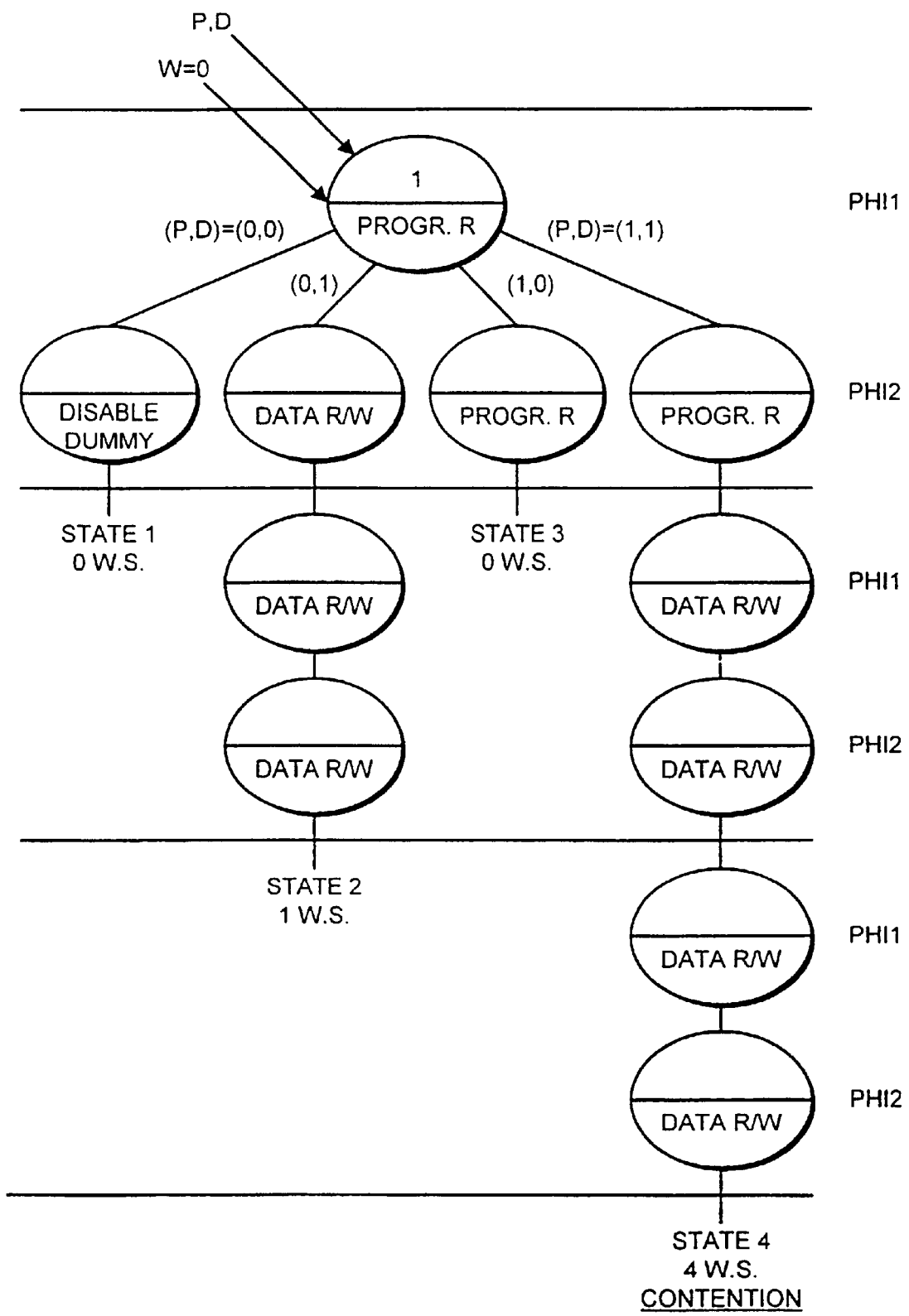
FIG. 4 shows a first state diagram for the common bus interface unit.

The bus arbitration and control unit 16 is also programmed to prioritise between data and program accesses. In this example, the bus arbitration and control unit 16 is programmed to give priority to program operations. As shown in FIG. 4, the program read operation occurs in the first part of the cycle, then the data read or write operation occurs during the second part of the cycle.

Figure 5:
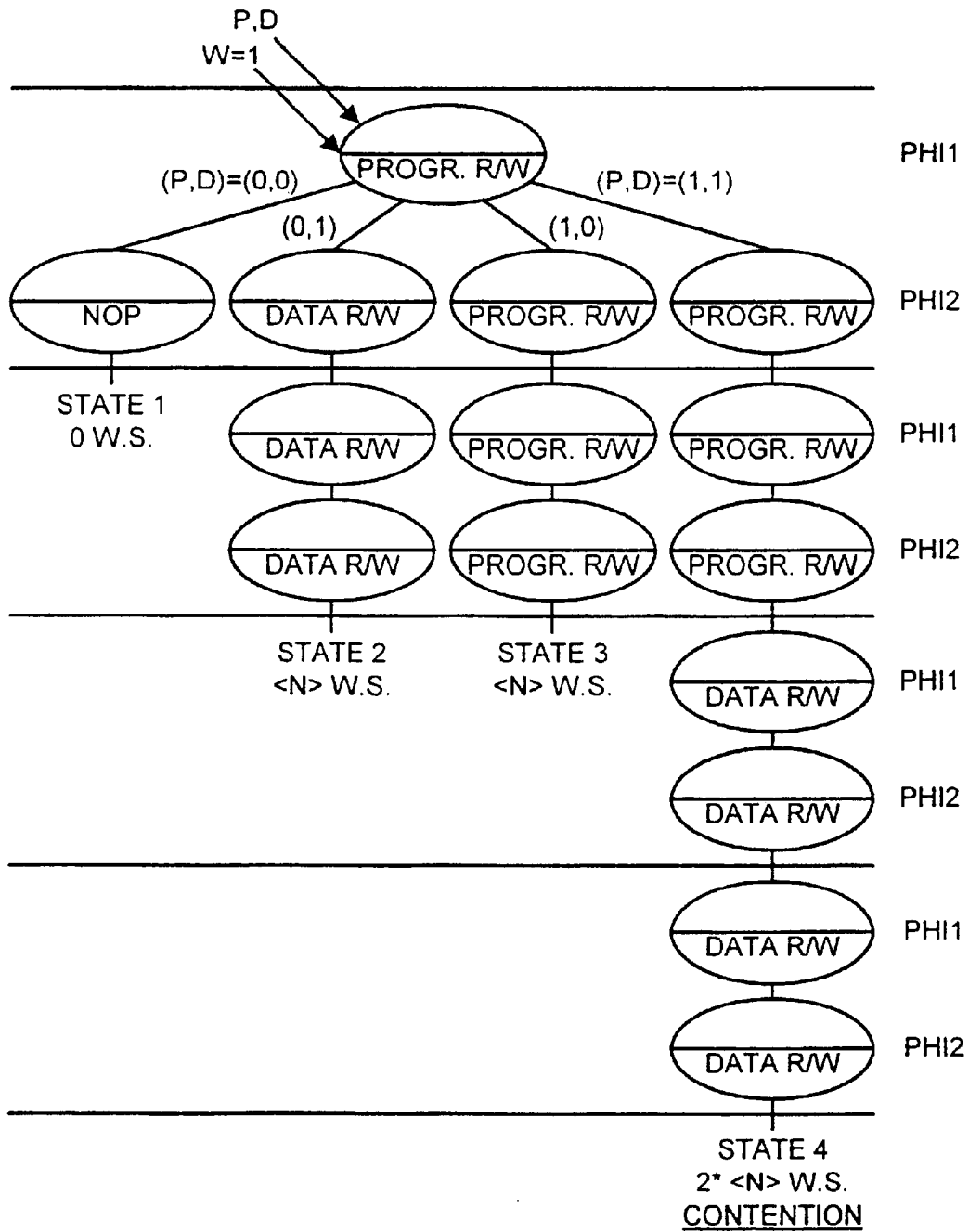
FIG. 5 shows a second state diagram for the common bus interface unit.
Figure 6:
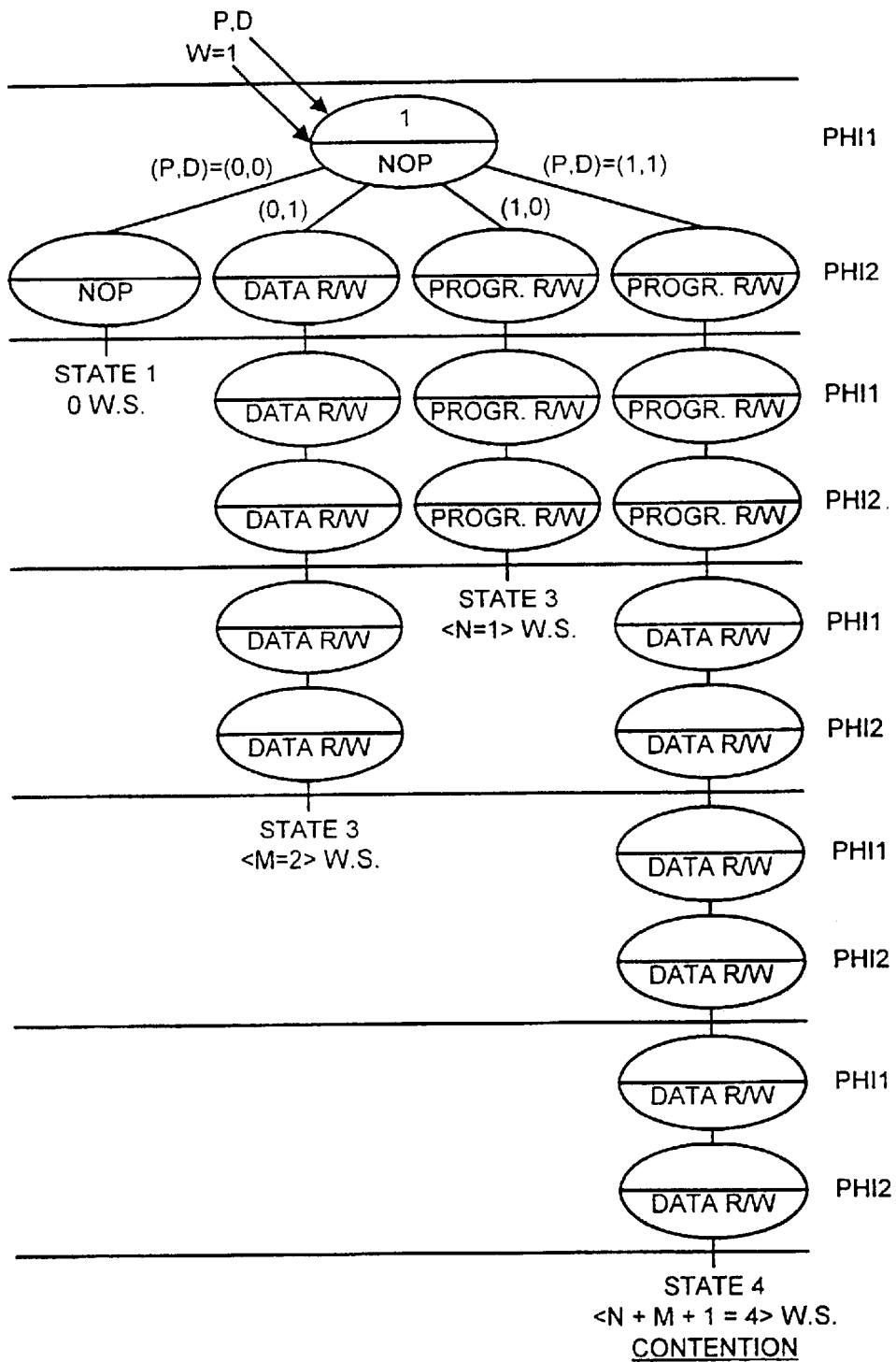
FIG. 6 shows a third state diagram for the common bus interface unit.

Situations where the wait state register is programmed for 1 or greater than 1 wait state (i.e. W=1) are shown in the lower half of the table in FIG. 3 and the second and third state diagrams shown in FIGS. 5 and 6. FIG. 5 shows the state diagram for N=M, and FIG. 6 shows the state diagram for N≠M.

In FIG. 5, when P=0 and D=0 there is no program or data operation on the common bus and the wait state generator 17 does not generate any wait signals 10 to prolong the DSP clock cycle. In the condition where D=1 the bus arbitration and control unit 16 detects that the DSP 2 requires a data read or write operation using the common buses 11, 12. Accordingly, the bus arbitration and control unit 16 instructs the wait state generator 17 to generate one wait state to extend the current DSP clock cycle to twice the fundamental clock cycle period to ensure that the clock cycle is sufficiently long to permit the external memory to be accessed and the data read or write operation to be performed.

Where P=1 and D=0, the bus arbitration and control unit 16 detects that the DSP 2 requires to use the common buses 11, 12 for a program read or write operation and instructs the wait state generator 17 to generate one wait state to the DSP to extend the current DSP clock cycle by an additional fundamental cycle. This ensures that the DSP has sufficient time to perform the program read or write operation in one cycle.

If P=1 and D=1, the bus arbitration and control unit 16 detects that the DSP requires to carry out both a program read or write operation and a data read or write operation, and instructs the wait state generator 17 to generate a wait signal 10 of value=3 (i.e. 3 wait states) to the DSP to prolong the current DSP clock cycle to four times the length of the DSP fundamental clock cycle period. The bus arbitration and control unit 16 also prioritises the operation and gives priority to the program read or write operation which, as shown in FIG. 5, occurs during the first part of the extended clock cycle and the data read or write operation occurs during second part of the extended clock cycle.

For all the write operations, the write signal to the external memory is always generated for N-½ cycle for program write or M-½ cycle for data write. This is important to ensure that data corruption does not occur due to a change in clock cycle when the write takes place.

The third state diagram (FIG. 6) shows the state diagram for N=1, M=2 and W=1, i.e. N and M have different values.

When there are no program or data operations required on the common buses 11, 12, P=0 and D=0 and no additional wait state generation required. Where P=0 and D=1, 2 wait states are generated, as M (which corresponds to the D signal) equals 2, so the wait state generator 17 generates a wait signal 10 of value=2 to instruct the DSP 2 to extend the clock cycle to three times the DSP fundamental clock cycle period. The data read or write operation occurs using the extended cycle.

When P=1 and D=0, the wait state generator 17 generates 1 wait state, as N (which corresponds to the P signal) equals 1. This extends the current DSP clock cycle to twice the DSP fundamental clock cycle period so that the program read or write operation can occur during the extended cycle.

When P=1 and D=1, this means that the DSP requires the common buses 11, 12 for both a program read or write operation and a data read or write operation. The bus arbitration and control unit 16 therefore, generates N+M+1 wait state, which in this example is equal 4, to instruct the DSP 2 to extend the current clock cycle to five times the DSP fundamental clock cycle period. As priority is given to program operations, the program read or write operation occurs during the first portion of the extended clock cycle and the data read or write operation occurs during second portion of the extended clock cycle.

Figure 7:
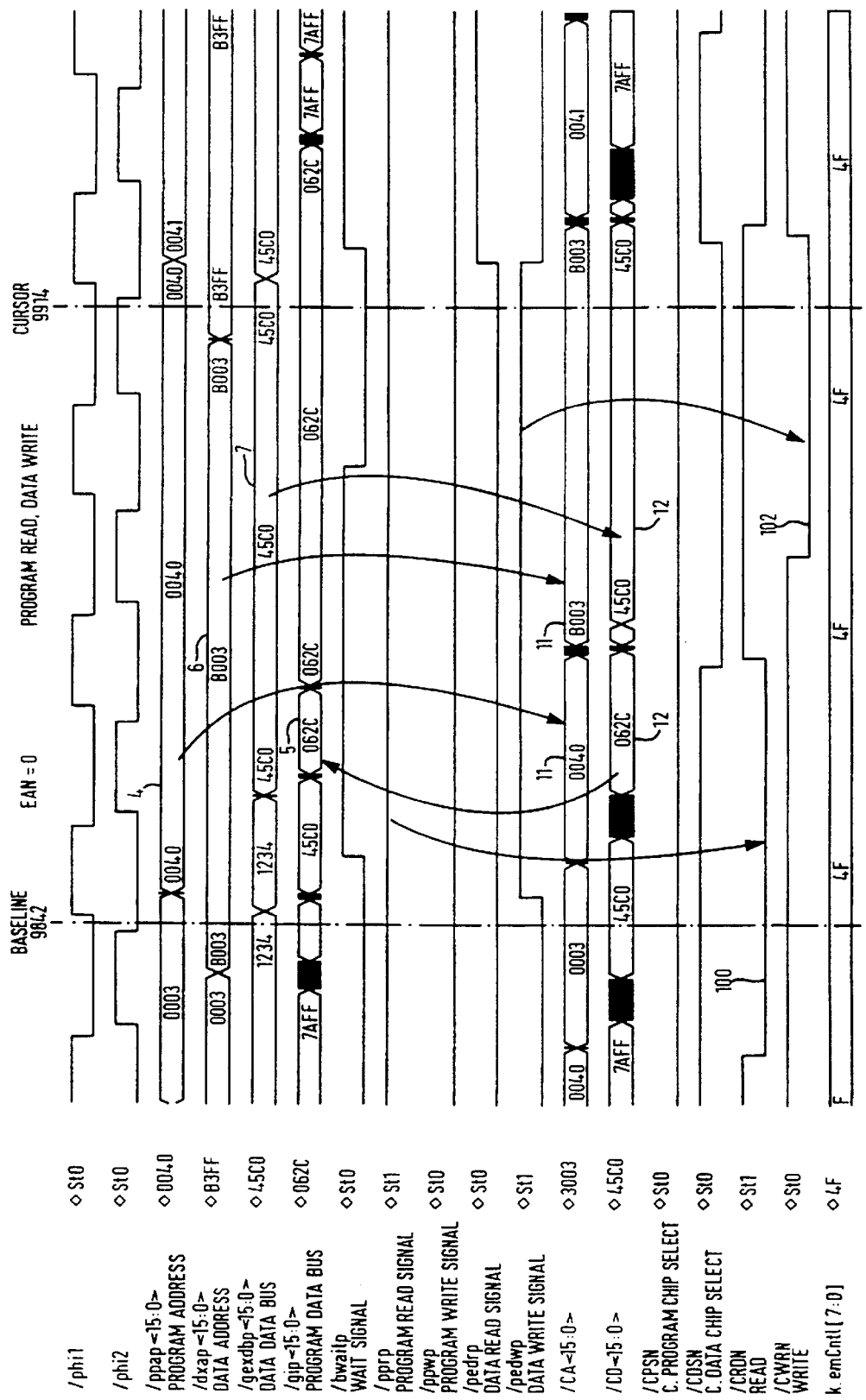
FIG. 7 shows a schedule of events for a program read and data write operation for the integrated circuit shown in FIG. 1.

An example of the scheduling of a program read and data write operation is shown in FIG. 7. In this example W=0, P=1 and D=1 and corresponds to the first state diagram shown in FIG. 4. The bus arbitration and control unit 16 detects that the DSP wishes to make a program read and a data write operation using the common buses 11, 12. The bus arbitration and control unit 16 therefore instructs the wait state generator 17 to send a wait state signal 10 to the DSP to extend the current clock signal to three times the DSP fundamental clock cycle period. The bus arbitration and control unit 16 then switches the multiplexer/tri-state bus controller 18 to couple the common buses 11, 12 to the program address and data buses 4, 5 and sends a read control signal 100 on the control bus 13. The program address 0040 is then sent through the program address bus 4 and the common address bus 11 to the selected memory device and the data 062C is retrieved from the memory device location 0040 via the common data bus 12, through the common bus interface unit 3 to the program data bus 5 and the DSP. After the program read operation has been completed, the bus arbitration and control unit 16 then switches the multiplexer/tri-state controller 18 to couple the common buses 11, 12 to the data address and data buses 6, 7. The DSP then accesses memory location B003 by sending this location through the data address bus 6 via the common bus interface unit 3 to the common address bus 11 which accesses the memory B003.

Subsequently, data 45C0 is sent by the DSP 2 on the data data bus 7 to the common data bus 12 via the common bus interface unit 3. The bus arbitration and control unit 16 then sets a write signal 102 on the common bus control signal bus 13 to write data 45C0 to memory location B003. The standard clock signal then finishes after the program read and data write operations have been completed during the extended clock cycle.

In addition, program read or write and data read or write operations can be performed using the host interface in a similar manner.

Hence, the invention has the advantage that by extending the DSP clock signal it is possible to perform both a program read and data write operation during an extended clock signal by using the bus arbitration and control unit 16 to control switching of the common buses 11, 12 to the program or data interfaces.

There is also the advantage that firm ware is not required to configure the interface and handle switching of the program and data interfaces to the common buses.

The use of a wait state generator also has the advantage that it increases the flexibility of the external memory devices with which processors or micro controllers, such as a DSP 2, can access. It also permits access time to be configured according to the performance of the memory being accessed and reduces the requirement for read only memory and or random access memory to be located on the same integrated circuit as the processor or micro controller.

What is claimed is:

1. An integrated circuit comprising a processing device; a program interface coupled to the processing device, the program interface comprising a first address bus and a first data bus; a data interface coupled to the processing device, the data interface comprising a second address bus and a second data bus; an address bus switching device adapted to be coupled to an external address bus, the address bus switching device coupled to the first and second address busses; a data bus switching device adapted to be coupled to an external data bus, the data bus switching device coupled to the first and second data buses; and arbitration means coupled to the processing device, the address bus switching device and the data bus switching device, the arbitration means controlling the address and data bus switching devices to couple the first address bus and the first data bus to the external address and data buses or to couple the second address bus and the second data bus to the external address and data buses, in response to control signals received from the processing device by allocating priority to the program interface over the data interface for coupling to the external address and data busses.

2. An integrated circuit according to claim 1, wherein the arbitration means comprises a delay generation means which generates a delay signal which is sent to the processing device to prolong a processing device clock cycle in accordance with an access speed of an external memory being accessed by the processing device through the data and address bus switching devices.

3. An integrated circuit according to claim 2, wherein the delay generation means generates delays which are a multiple of the processing device fundamental clock cycle period.

4. An integrated circuit according to claim 2, wherein the length of the delay generated by the delay generation means is dependent on whether the processing device request a program read or write operation, a data read or write operation or both a program and a data read or write operation to an external memory device.

5. An integrated circuit according to claim 4, wherein in the case in which the processing device requests both a program and a data read or write operation to an external memory device during a clock cycle, the arbitration means allocates priority to the program interface over the data interface for coupling to the external address and data busses.

* * * * *